(12) United States Patent
Shimano et al.

(10) Patent No.: US 7,111,373 B2
(45) Date of Patent: Sep. 26, 2006

(54) APPARATUS FOR FACILITATING ASSEMBLING OF A COVERING SHEET ONTO A CUSHIONED PADDING

(75) Inventors: Toshiyuki Shimano, Tochigi (JP); Kentaro Tokunaga, Tochigi (JP); Yoshinobu Suzuki, Tochigi (JP)

(73) Assignee: TS TECH Co., Ltd., Saitama (JP)

( * ) Notice: Subject to any disclaimer, the term of this patent is extended or adjusted under 35 U.S.C. 154(b) by 353 days.

(21) Appl. No.: 10/446,631

(22) Filed: May 28, 2003

(65) Prior Publication Data

US 2004/0031137 A1 Feb. 19, 2004

(30) Foreign Application Priority Data

May 31, 2002 (JP) .............................. 2002-160600

(51) Int. Cl.
*B68G 7/00* (2006.01)
(52) U.S. Cl. ............................................ 29/91.5; 29/91
(58) Field of Classification Search ................. 29/91.5, 29/91, 91.1, 281.3, 448, 281.1, 281.4
See application file for complete search history.

(56) References Cited

U.S. PATENT DOCUMENTS 5,457,864 A * 10/1995 Sakaida ...................... 29/91.5

FOREIGN PATENT DOCUMENTS

JP 406031061 * 2/1994

* cited by examiner

*Primary Examiner*—John C. Hong
(74) *Attorney, Agent, or Firm*—Dann, Dorfman, Herrell and Skillman, P.C.

(57) ABSTRACT

An apparatus for facilitating assembling of a covering sheet onto a cushioned padding for a seat, the covering sheet being formed into a three-dimensional shape and having tensioning cords provided therein, the cushioned padding having a central portion, bulged portions formed at both sides of the central portion, and grooves formed in the central portion, the tensioning cords of the covering sheet being to be received in the grooves of the cushioned padding at the time of fastening of the covering sheet to the cushioned padding, and being to be fastened to the cushioned padding, the apparatus including a base table, a supporting member mounted on the base table for receiving and supporting the cushioned padding at the time of the assembling of the covering sheet onto the cushioned padding, hooking arms arranged at both sides of the base table for causing the bulged portions of the cushioned padding on the supporting member to be pulled away from each other and causing the grooves of the cushioned padding to be widened, and spaced apart holding clamps arranged on the base table for pressing the cushioned padding from both sides of the cushioned padding and causing the cushioned padding to be compressed and deformed at the time of covering of the cushioned padding with the covering sheet.

24 Claims, 9 Drawing Sheets

APPARATUS FOR FACILITATING ASSEMBLING OF A COVERING SHEET ONTO A CUSHIONED PADDING

BACKGROUND OF THE INVENTION

1. Field of the Invention

This invention relates to an apparatus for facilitating assembling of a covering sheet onto a cushioned padding for a seat and, more particularly, to an apparatus which facilitates fastening of a covering sheet to a cushioned padding using tensioning cords, and facilitates covering of the cushioned padding with the covering sheet.

2. Description of the Prior Art

Referring now to FIGS. 1 to 4, a conventional method for assembling a covering sheet onto a cushioned padding for, e.g., a seat back of a vehicle seat will be discussed hereinafter in order to facilitate understanding of this invention.

Figure 1:
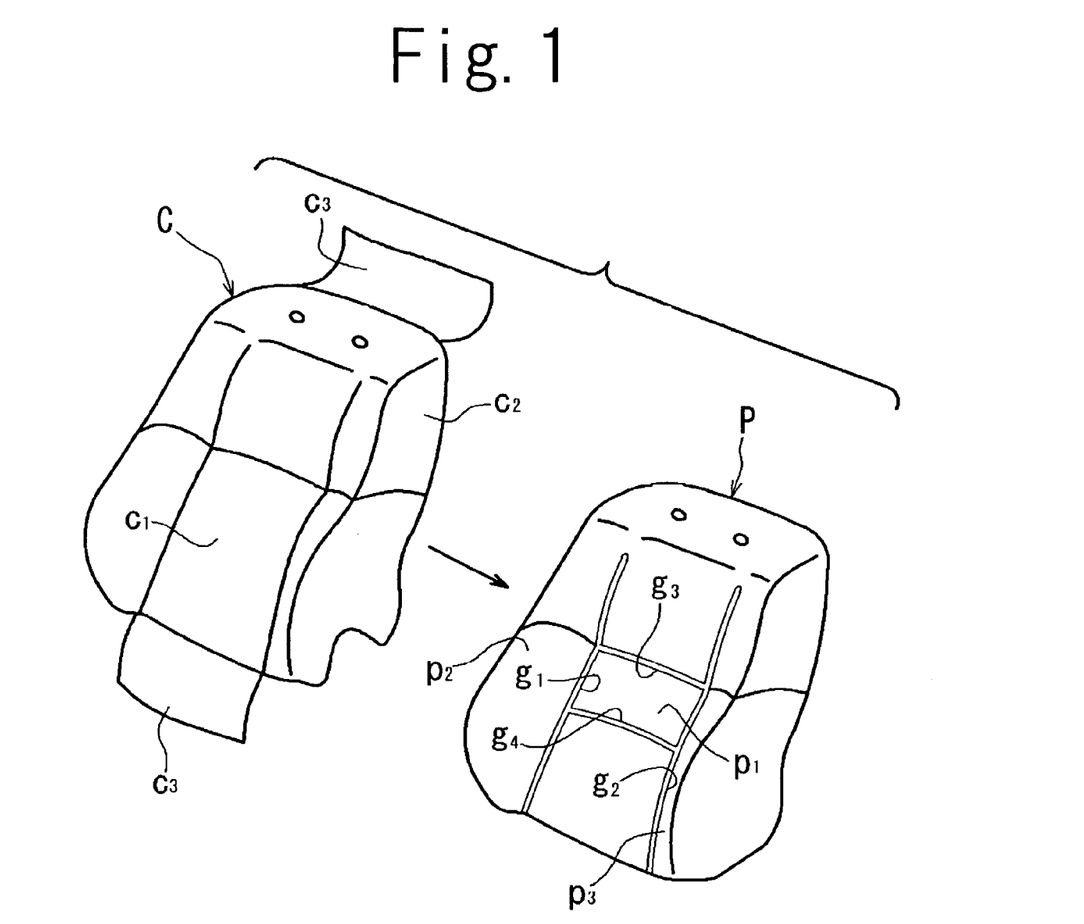
FIG. 1 is a schematic perspective view of a covering sheet and a cushioned padding, and of assistance in explaining a conventional method for assembling the covering sheet onto the cushioned padding.

As shown in FIG. 1, a first piece c1 of covering material, two second pieces c2 of covering material (only one second piece is shown in FIG. 1), and two third pieces c3 of covering material are sewed together using a needle, whereby a covering sheet C which has a three-dimensional shape and which is opened at a rear side of the three-dimensional covering sheet is prepared. A cushioned padding P has a central portion p1 corresponding to a portion of a finished seat back against which a person rests when the person sits on a finished seat having the seat back, bulged portions p2, p3 formed at left and right side portions of the central portion p1, and a cavity (not shown) formed in a back side of the cushioned padding P, in which a seat back frame is to be assembled. The first piece c1 of the covering sheet C is to cover the central portion p1 of the cushioned padding P, the second pieces c2 of the covering sheet C are to cover the bulged portions p2, p3 of the cushioned padding, and the third pieces c3 of the covering sheet C are to cover the back side of the cushioned padding P. The three-dimensional covering sheet C has vertically and horizontally extending tensioning cords (not shown) provided in an interior of the covering sheet C. The central portion p1 of the cushioned padding P has vertically and horizontally extending grooves g1, g2, g3, g4 formed in a surface thereof. As will be discussed in greater detail hereinafter, the vertically and horizontally extending tensioning cords which are provided in the three-dimensional covering sheet C are to be received in the grooves g1, g2, g3, g4 of the cushioned padding P and are to be fastened to the cushioned padding P.

Figure 2:
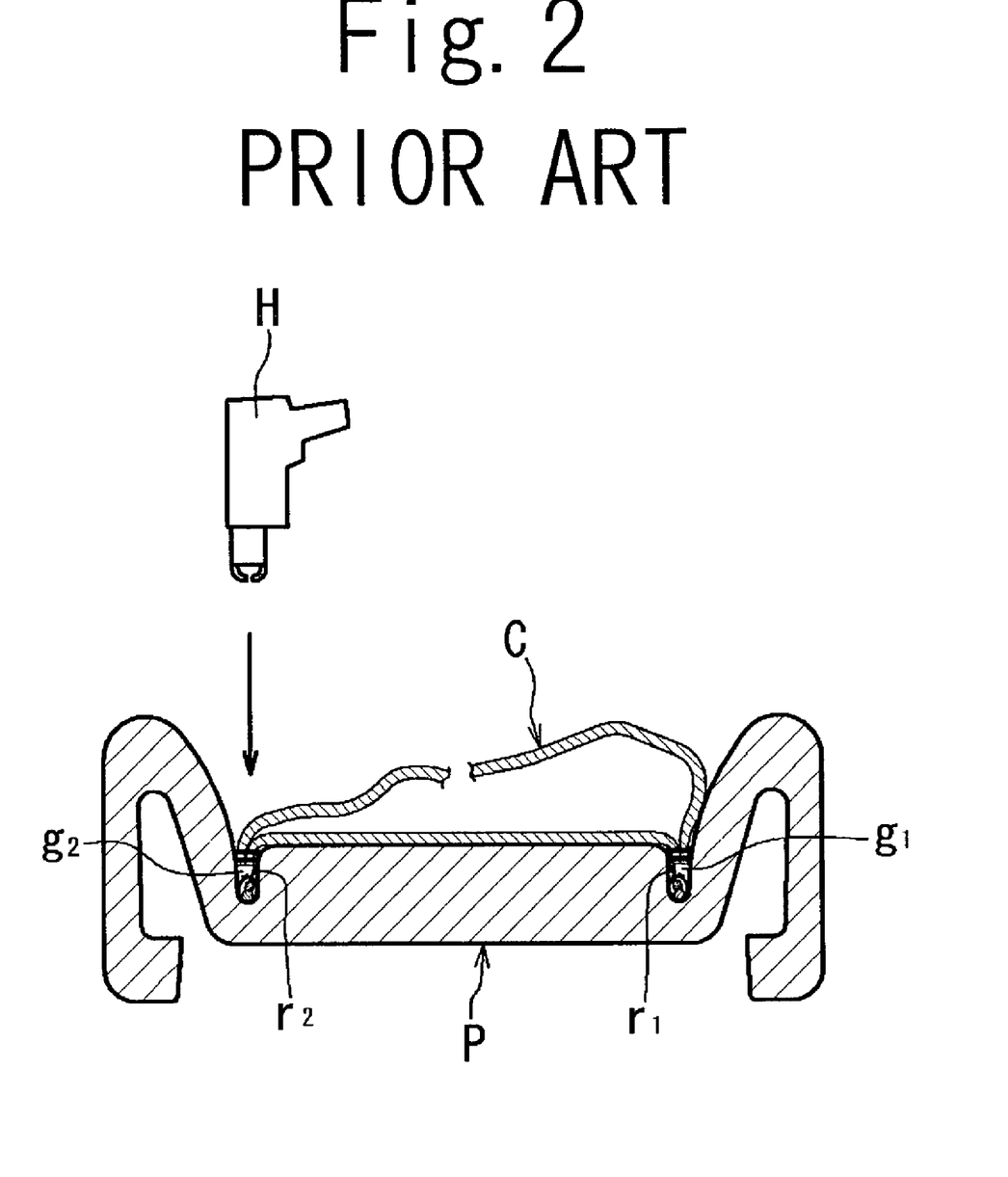
FIG. 2 is a schematic cross-sectional view of the covering sheet and the cushioned padding and of assistance in explaining a process of fastening of the covering sheet to the cushioned padding in the conventional method.
Figure 3:
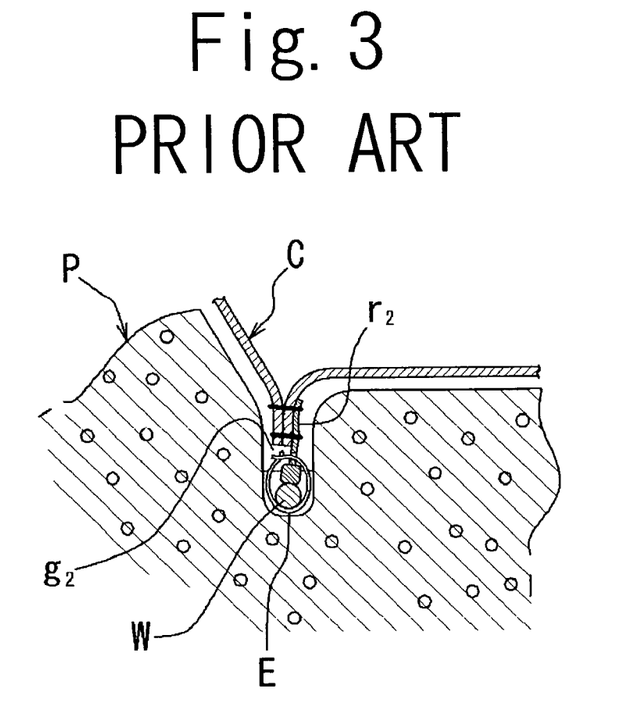
FIG. 3 is a schematic enlarged fragmentary sectional view of assistance in explaining the fastening of the covering sheet to the cushioned padding.

Referring to FIG. 2, fastening of the covering sheet C to the cushioned padding P is performed by causing the covering sheet C to be turned inside out, manually pulling the tensioning cords r1, r2 of the covering sheet C, causing the tensioning cords r1, r2 to be received in the grooves g1, g2 of the cushioned padding P by hand, and fastening the tensioning cords r1, r2 to the cushioned padding P by C-rings which are to be shot into the grooves g1, g2 by a handy gun H. More particularly, as best shown in FIG. 3, the cushioned padding P has insert wires W (only one insert wire W is shown in FIG. 3) which are previously provided in the cushioned padding P in a state where they are exposed to the grooves from the cushioned padding P. The fastening of the covering sheet C to the cushioned padding P is carried out by shooting the C-ring E from the handy gun H into the groove r1 in such a manner that the C-ring E is twined round the insert wire W. However, in such a manual method, it is hard to cause the tensioning cords to be received in the grooves of the cushioned padding and fasten the tensioning cords to the cushioned padding, because the grooves are formed deeply in the cushioned padding, particularly, the vertically extending grooves g1, g2 formed in portions of the cushioned padding P which are adjacent the bulged portions p2, p3 are deep. Therefore, there is a possibility that the tensioning cords will be easily separated from the cushioned padding.

Figure 4:
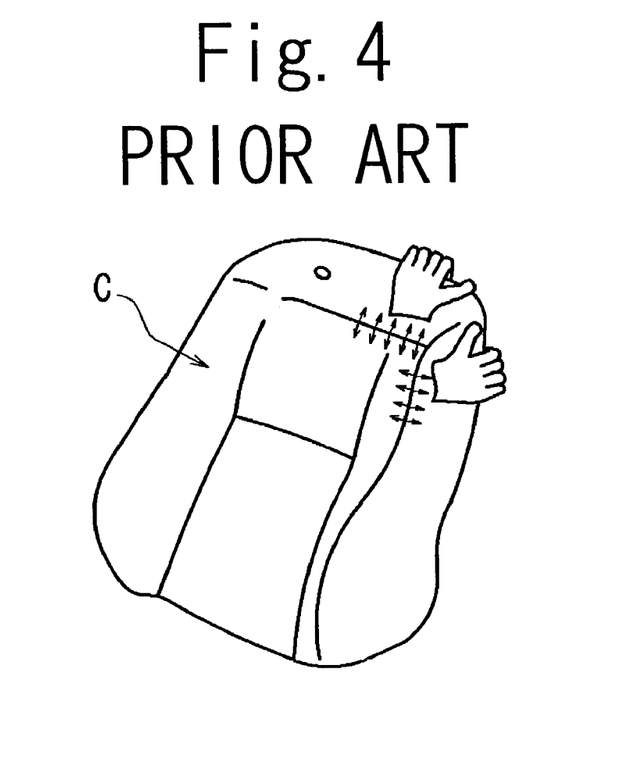
FIG. 4 is a schematic perspective view of assistance in explaining a problem with which covering of the cushioned padding with the covering sheet according to the conventional method is encountered.

After the fastening of the tensioning cords to the cushioned padding P, as shown in FIG. 4, covering of the cushioned padding P with the covering sheet C is performed by manually pulling the covering sheet C while causing the right side of the covering sheet C to be out. At this time, high-tension is applied to the covering sheet from the cushioned padding. The tension is intensively applied to sewed portions of the pieces making up the covering sheet, so that the sewed portions of the covering sheet C are pulled away from each other so as to be opened, and holes which were provided in the covering sheet C by the needle, when the pieces making up the covering sheet were sewed together using the needle, are exposed. This detracts from an appearance of a finished product.

SUMMARY OF THE INVENTION

The present invention has been made with a view to overcoming the foregoing problems of the prior art method.

It is therefore an object of the present invention to provide an apparatus for facilitating assembling of a covering sheet onto a cushioned padding, which facilitates fastening of the covering sheet to the cushioned padding and facilitates covering of the cushioned padding with the covering sheet.

It is another object of the present invention to provide an apparatus for facilitating assembling of a covering sheet onto a cushioned padding, which is simple in construction.

In accordance with the present invention, there is provided an apparatus for facilitating assembling of a covering sheet onto a cushioned padding for a seat. The covering sheet is formed into a three-dimensional shape and has tensioning cords provided therein. The cushioned padding has a central portion, bulged portions formed at both sides of the central portion, and grooves formed in a surface of the central portion. The tensioning cords are to be received in the grooves of the cushioned padding at the time of fastening of said covering sheet to the cushioned padding and are to be fastened to the cushioned padding by C-rings which are to be shot by a handy gun. The apparatus comprises a base table, supporting means mounted on a front surface of the base table for receiving and supporting the cushioned padding thereon at the time of the assembling of the covering sheet onto the cushioned padding, and hooking arms arranged at both sides of the base table for causing the bulged portions of the cushioned padding on the supporting means to be pulled away from each other and causing the grooves of the cushioned padding to be widened, so that the apparatus facilitates fastening of the covering sheet to the cushioned padding by the C-rings.

The covering sheet comprises a first piece of covering material for covering the central portion of the cushioned padding, second pieces of covering material for covering the bulged portions of the cushioned padding, and third pieces of covering material for covering a back side of the cushioned padding, the first, second and third pieces of covering material being sewed together, whereby the covering sheet is formed into a three-dimensional shape. The cushioned padding has a cavity formed in the back side thereof, in which a seat frame is to be assembled. The cushioned padding is to be supported on the supporting means with the cavity receiving the supporting means.

The apparatus further includes supporting brackets arranged at the both sides of the base table for supporting the cushioned padding on the supporting means from both sides of the cushioned padding.

The apparatus further includes a stand post to which the base table is supported in an inclined state.

The apparatus further includes first drive means attached to the base table for causing the hooking arms to be moved forwardly from the base table and to be pivotally moved.

The apparatus further includes spaced apart holding clamps arranged on the front surface of the base table for pressing the cushioned padding on the supporting means from both sides of the cushioned padding, and causing the cushioned padding to be deformed and compressed in such a manner that a width of the cushioned padding is narrowed at the time of covering of the cushioned padding with the covering sheet, so that the apparatus facilitates the covering of the cushioned padding with the covering sheet.

The apparatus further includes second drive means mounted on the front surface of the base table for causing the holding clamps to be moved toward the both sides of the cushioned padding on the supporting means.

The apparatus further includes a holding plate arranged at an upper portion of the base table for pressing the cushioned padding on the supporting means from a back side of the cushioned padding at the time of the covering of the cushioned padding with the covering sheet.

The apparatus further includes third drive means mounted to the base table for causing the holding plate to be moved toward the back side of the cushioned padding.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denote the same parts throughout the Figures and wherein.

DETAILED DESCRIPTION OF THE PREFERRED EMBODIMENT

An apparatus for facilitating assembling of a covering sheet onto a cushioned padding according to an embodiment of the present invention will be discussed hereinafter with reference to FIGS. 5 to 12. The apparatus is adapted to be able to treat such a covering sheet as shown in FIG. 1 and such a cushioned padding as shown in FIG. 1. More particularly, the apparatus facilitates successively carrying out fastening of the covering sheet to the cushioned padding and covering of the cushioned padding with the covering sheet. A case where a covering sheet constructed in the same manner as the covering sheet C of FIG. 1 is done, and a cushioned padding constructed in the same manner as the cushioned padding of FIG. 1 is done are treated by the apparatus will be referred to in the following. Therefore, the description of the cushioned padding and the covering sheet will not be repeated.

Figure 5:
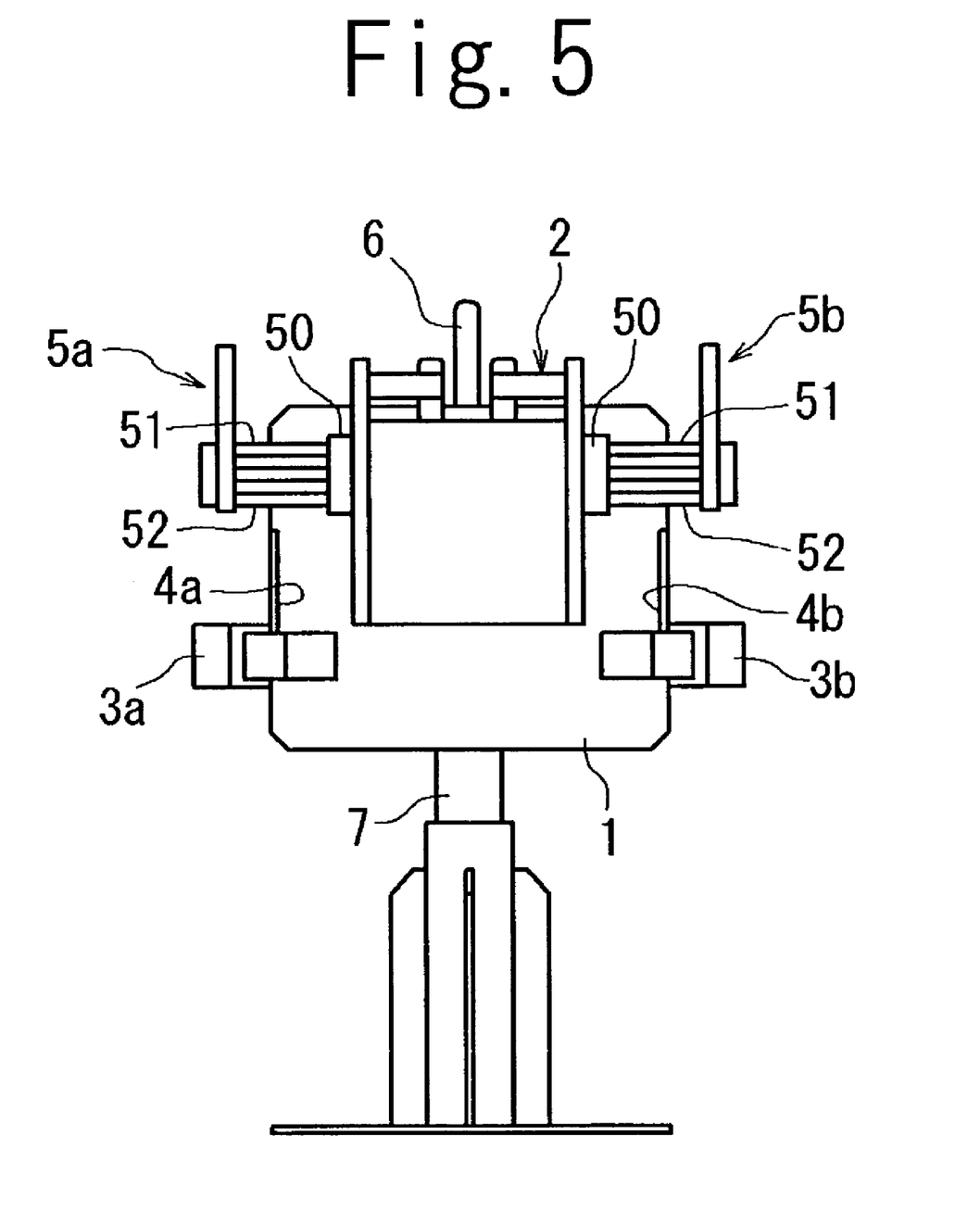
FIG. 5 is a schematic front elevation view of an apparatus for facilitating assembling of a covering sheet onto a cushioned padding, according to an embodiment of the present invention.

Referring now to FIG. 5, there is illustrated an apparatus for facilitating assembling of a covering sheet onto a cushioned padding according to an embodiment of the present invention. The apparatus generally includes a stand post 7, a base table 1 supported to the stand post 7, supporting means 2 mounted on a front surface of the base table 1 for receiving and supporting the cushioned padding at the time of assembling of the covering sheet onto the cushioned padding, arm means for causing the bulged portions of the cushioned padding supported by the supporting means 2 to be pulled away from each other and causing the grooves of the cushioned padding to be widened when the covering sheet is to be fastened to the cushioned padding, first drive means for actuating the arm means, holding means for pressing the cushioned padding on the supporting means 2 from both sides of the cushioned padding and causing the cushioned padding to be compressed and deformed when the cushioned padding is to be covered with the covering sheet, and second drive means for actuating the holding means.

As discussed above, the cushioned padding has the cavity in the back side thereof in which the seat back frame is to be assembled after the covering sheet is assembled onto the cushioned padding. When the covering sheet is assembled onto the cushioned padding, the cushioned padding is to be set on the supporting means 2 with the cavity thereof receiving the whole supporting means 2.

Figure 6:
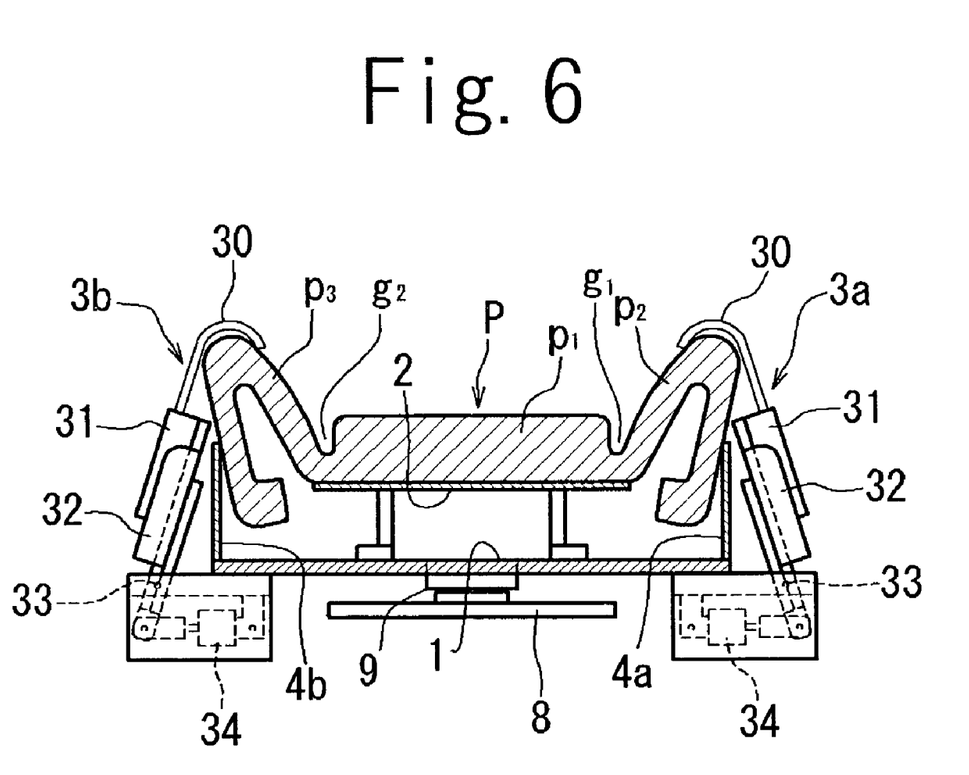
FIG. 6 is a schematic sectional plan view of the apparatus, in which the cushioned padding is set on the apparatus.

Referring to FIG. 6, the arm means comprises a pair of spaced apart hooking arms 3a, 3b which are adapted to be actuated by the first drive means as will be discussed in greater detail hereinafter. The hooking arms 3a, 3b have substantially J-shaped bodies 30 and are arranged at both sides of a lower portion of the base table 1 as shown in FIG. 5. As will be discussed in greater detail hereinafter, the hooking arms 3a, 3b are adapted to be engaged with the bulged portions p2, p3 of the cushioned padding P when the covering sheet is to be fastened to the cushioned padding P on the supporting means 2. In a state where the hooking arms 3a, 3b are engaged with the bulged portions p2, p3 of the cushioned padding P, when the hooking arms 3a, 3b are actuated by first drive cylinders of the first drive means, the bulged portions p2, p3 of the cushioned padding P are pulled away from each other by the hooking arms 3a, 3b, whereby the grooves g1, g2 of the cushioned padding P are widened.

The first drive means for actuating the hooking arms 3a, 3b comprises first spaced apart drive cylinders 31 for moving the hooking arms 3a, 3b forwardly from the base table 1 or vertically relative to a sheet of FIG. 6, and second spaced apart drive cylinders 34 for causing the hooking arms 3a, 3b to be pivotally moved. The hooking arms 3a, 3b are mounted on rod ends of the first drive cylinders 31. The first drive cylinders 31 are mounted on cylinder holders 32 which are pivotally supported to the both sides of the lower portion of the base table 1 by supporting axes 33. The second drive cylinders 34 are adapted to be actuated so as to be extended laterally and are arranged at the both sides of the lower portion of the base table 1. Rod ends of the second drive cylinders 34 are connected to the cylinder holders 32, so that when the second drive cylinders 34 are actuated so as to be extended or contracted, the hooking arms 3a, 3b are pivotally moved around the supporting axes 33.

The apparatus further includes spaced apart supporting brackets 4a, 4b mounted to the both sides of the base table 1. The supporting brackets 4a, 4b serve as means to support the cushioned padding P from the both sides of the cushioned padding P in a state where the cushioned padding P is supported on the supporting means 2. Also, the supporting brackets 4a, 4b serve as means to hold the bulged portions p2, p3 of the cushioned padding P when fastening of the covering sheet to the cushioned padding is carried out while causing the bulged portions p2, p3 of the cushioned padding P to be pulled away from each other and causing the grooves g1, g2 of the cushioned padding P to be widened by the hooking arms 3a, 3b.

Figure 7:
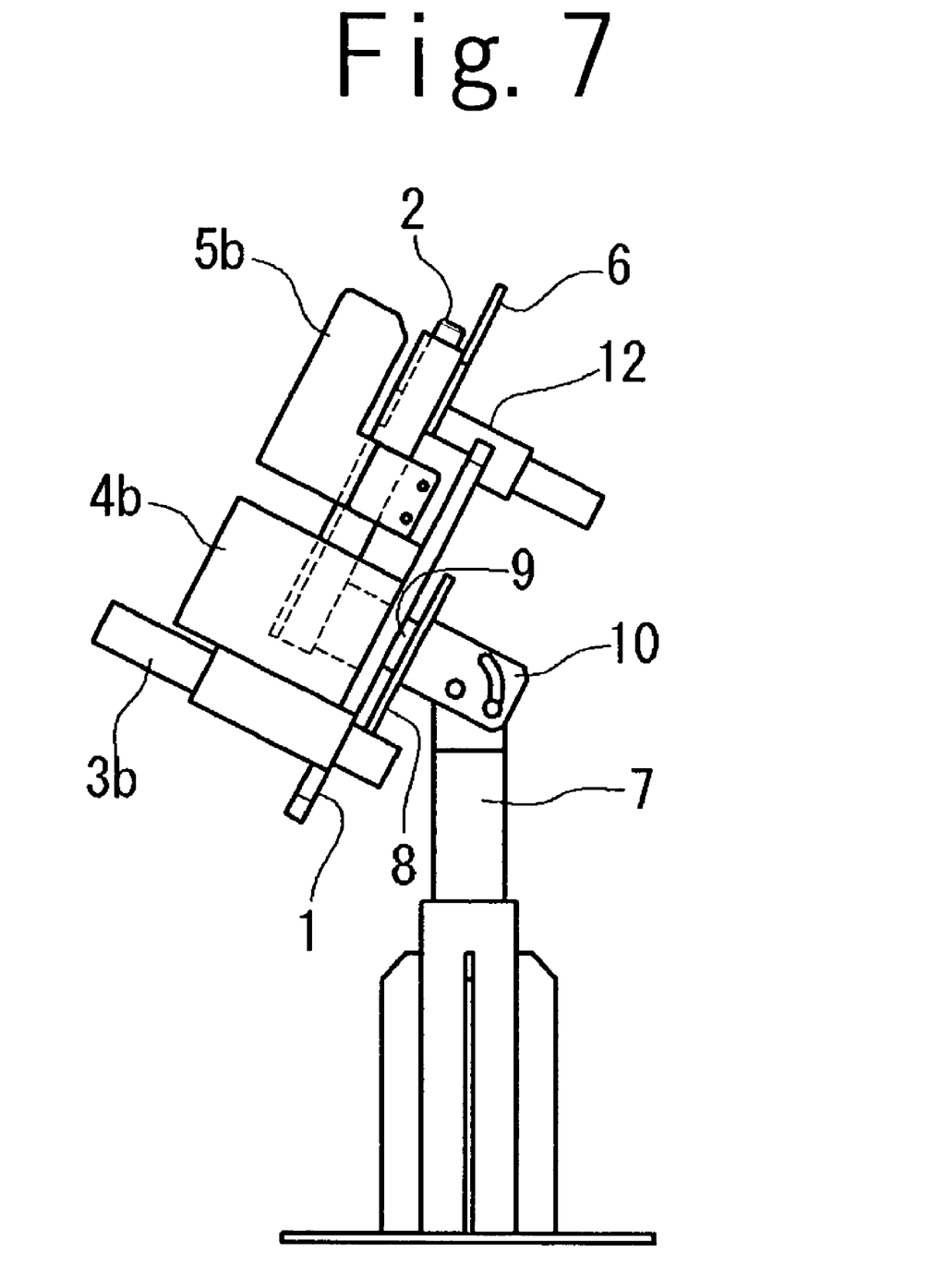
FIG. 7 is a schematic side elevation view of the apparatus.

Again referring to FIG. 5, the holding means comprises spaced apart holding clamps 5a, 5b located at an upper portion of the base table 1 for pressing the cushioned padding on the supporting means 2 from the both sides of the cushioned padding, mainly, shoulder portions of the cushioned padding, causing the cushioned padding to be compressed and deformed, when covering of the cushioned padding with the covering sheet is carried out. Although only the holding clamp 5b is shown in FIG. 7, each of the holding clamps 5a, 5b has a substantially L-shaped body as viewed from the side. The holding clamps 5a, 5b are adapted to be actuated by the second drive means.

As shown in FIG. 5, the second drive means comprises third spaced apart drive cylinders 50 mounted on the upper portion of the base table 1. Each of the third drive cylinders 50 is adapted to be actuated so as to be extended and contracted laterally. The extending and contracting movements of the third drive cylinders 50 is adapted to be guided by slide guides 51, 52 which are mounted on the base table 1. The holding clamps 5a, 5b are mounted on rod ends of the third drive cylinders 50.

As shown in FIGS. 5 and 7, the apparatus further includes a holding plate 6. The holding plate 6 serves as means to hold or press the cushioned padding on the supporting means 2 from the back side of the cushioned padding when covering of the cushioned padding with the covering sheet is carried out. The holding plate 6 is connected to a rod end of a fourth drive cylinder 12 (see FIG. 7) and extends upwardly at a substantially middle region of an upper edge of the base table 1. The fourth drive cylinder 12 is arranged at the back of the support means 2 and mounted to the upper edge portion of the base table 1.

As shown in FIG. 7, the base table 1 is supported in an inclined state to the stand post 7. Therefore, a worker can naturally and efficiently work using the apparatus. The stand post 7 may be provided with any suitable conventional adjusting means (not shown) for adjusting a height of the stand post 7. In this case, in order that the worker can work in a natural standing posture, the height of the stand post 7 can be adjusted by the adjusting means, depending on a stature of the worker. Also, in order that the base table 1 can be turned, the base table 1 may be supported to the stand post 7 through bearing means. The bearing means comprises bearings (not shown), a holder 9 holding the bearings, and a supporting plate 8 supporting the holder 9. Further, in order to control an angle of the base table 1, the base plate 1 may be supported to the stand post 7 through any suitable conventional angle controlling mechanism 10 which is arranged between the supporting plate 8 and the stand post 7.

Referring now to FIGS. 6 and 8 to 12, the operation of the apparatus will be discussed in detail hereinafter.

Figure 8:
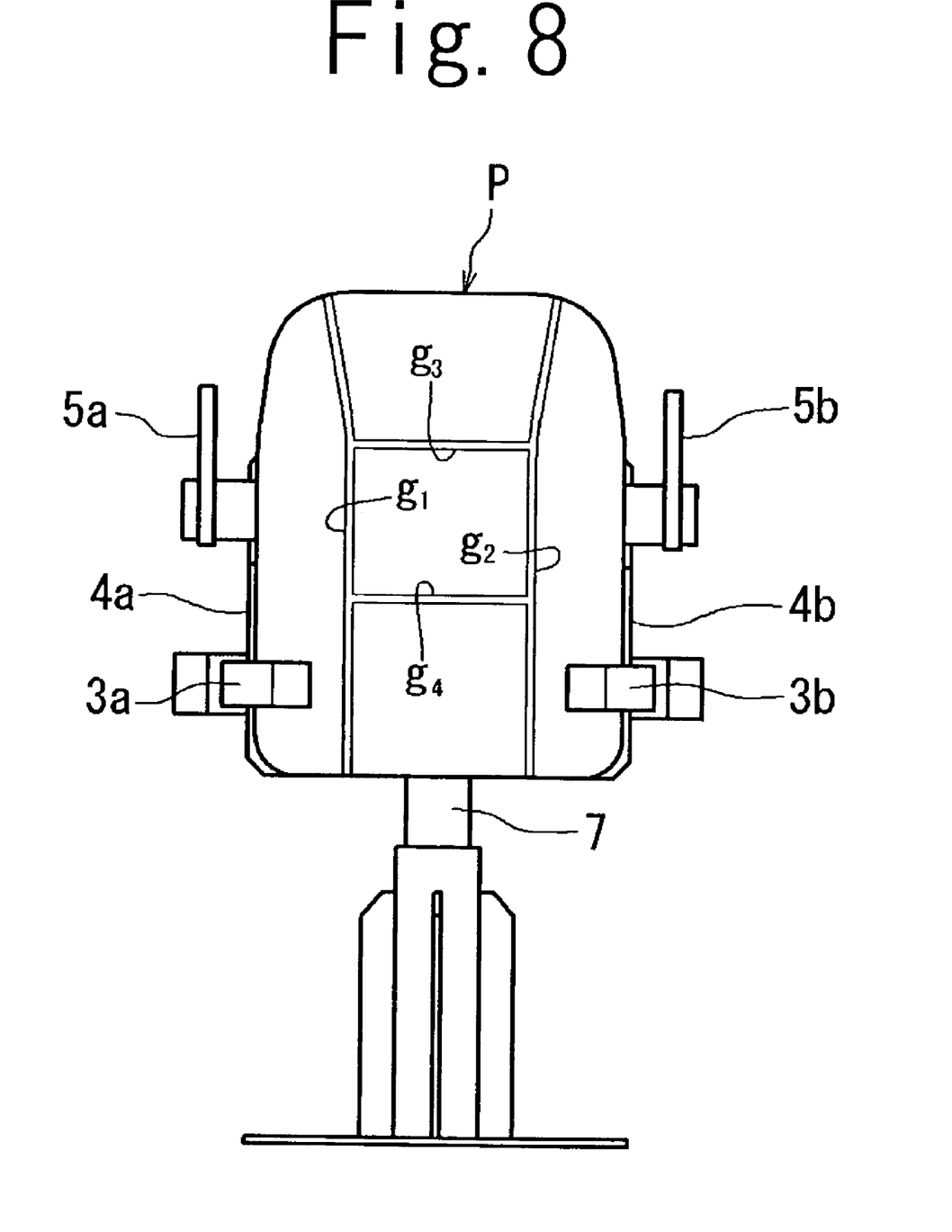
FIG. 8 is a schematic front elevation view showing a state where the cushioned padding is set on the apparatus.

In a state where the rods of the third drive cylinders 50 are extended as shown in FIG. 5 and the hooking arms 3a, 3b are projected forwardly by actuation of the first drive cylinders 31 (see FIG. 6), the cushioned padding P is at first put on the supporting means 2 with the cavity of the cushioned padding P receiving the supporting means 2, whereby the cushioned padding P is supported by the supporting means 2 as shown in FIG. 8. In this state, the cushioned padding P is supported from the both sides thereof by the holding brackets 4a, 4b.

Figure 9:
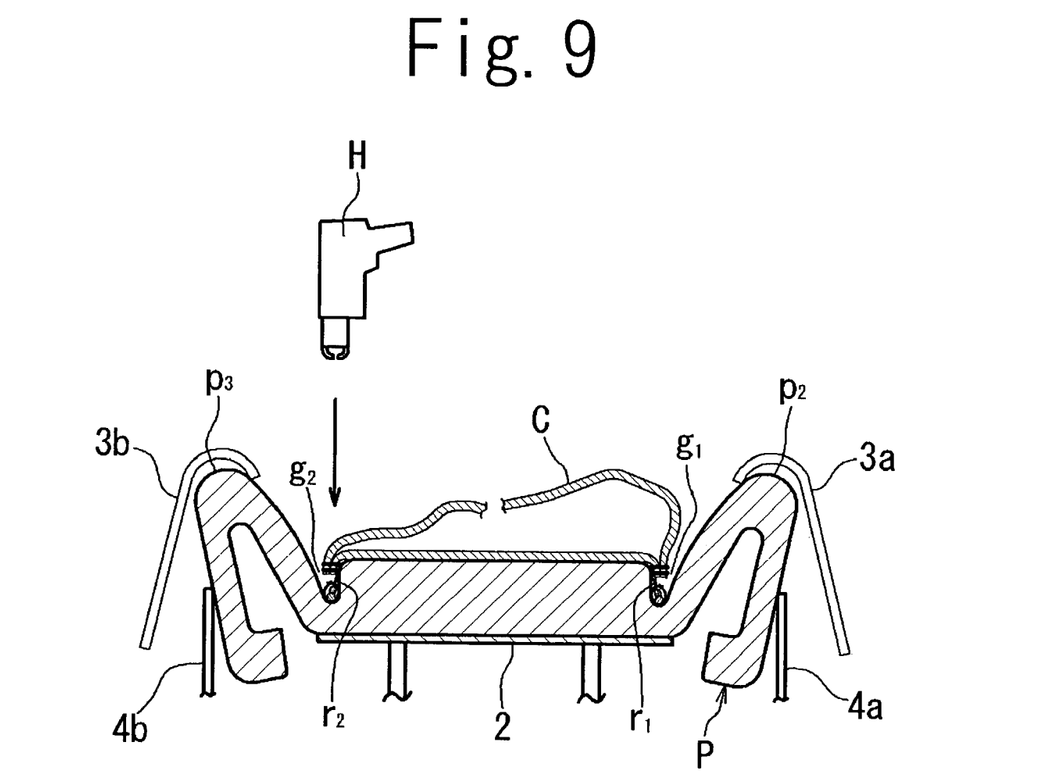
FIG. 9 is a schematic cross-sectional view of assistance in explaining a process of fastening of the covering sheet to the cushioned padding which is carried out using the apparatus.
Figure 10:
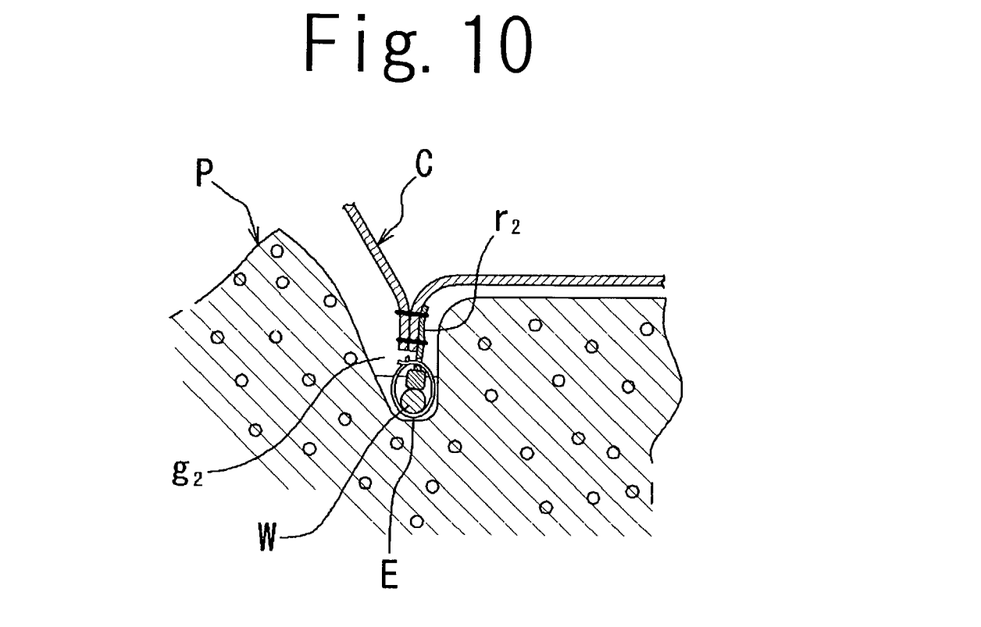
FIG. 10 is a schematic enlarged fragmentary sectional view of assistance in explaining the fastening of the covering sheet to the cushioned padding which is performed using the apparatus.

After the cushioned padding P is set on the apparatus as described above, the second drive cylinders 34 (see FIG. 6) are actuated so as to be extended, whereby the hooking arms 3a, 3b are rotated around the supporting axes 33 so as to approach each other. Then, the first drive cylinders 31 are actuated so as to be contracted, whereby the hooking arms 3a, 3b are moved toward the base table 1 and operatively engaged with the bulged portions p2, p3 of the cushioned padding P. In this state, when the second drive cylinders 34 are actuated so as to be contracted, the hooking arms 3a, 3b which have been engaged with the bulged portions p2, p3 of the cushioned padding P are pivotally moved away from each other around the supporting axes 33. By the pivotal movements of the hooking arms 3a, 3b, the bulged portions p2, p3 of the cushioned padding P are pulled away from each other while being pressed against the holding brackets 4a, 4b, whereby the grooves g1, g2 of the cushioned padding P are widened as shown in FIG. 6. Therefore, even if the grooves of the cushioned padding P are formed deeply in the cushioned padding P, the grooves can be easily widened. In a condition where the grooves g1, g2 of the cushioned padding P are widened as shown in FIG. 6, the covering sheet C which was previously turned inside out is put on the cushioned padding P and the tensioning cords r1, r2 of the covering sheet C can be easily received in the grooves g1, g2 of the cushioned padding P as shown in FIG. 9. In this condition, as shown in FIGS. 9 and 10, the worker can easily shoot C-rings into the grooves g1, g2 of the cushioned padding P by operating a handy gun H in such a manner that the C-rings E (only one C-ring E is shown in FIG. 10) can be twined round insert wires W (only one insert wire W is shown in FIG. 10) which are previously provided in the cushioned padding P in a state where the insert wires W are exposed to the grooves g1, g2 from the cushioned padding P. Thus, the covering sheet C can be securely fastened to the cushioned padding P by the C-rings. Thereafter, the second drive cylinders 34 are actuated so as to be extended, whereby the hooking arms 3a, 3b are pivotally moved so as to approach each other. Then, the first drive cylinders 31 are actuated so as to be extended, whereby the hooking arms 3a, 3b are operatively projected forwardly from the cushioned padding P on the supporting means 2 while being disengaged from the bulged portions p2, p3 of the cushioned padding P. Further, the second drive cylinders 34 are actuated so as to be contracted, whereby the hooking arms 3a, 3b are rotated away from each other around the supporting axes 33.

Figure 11:
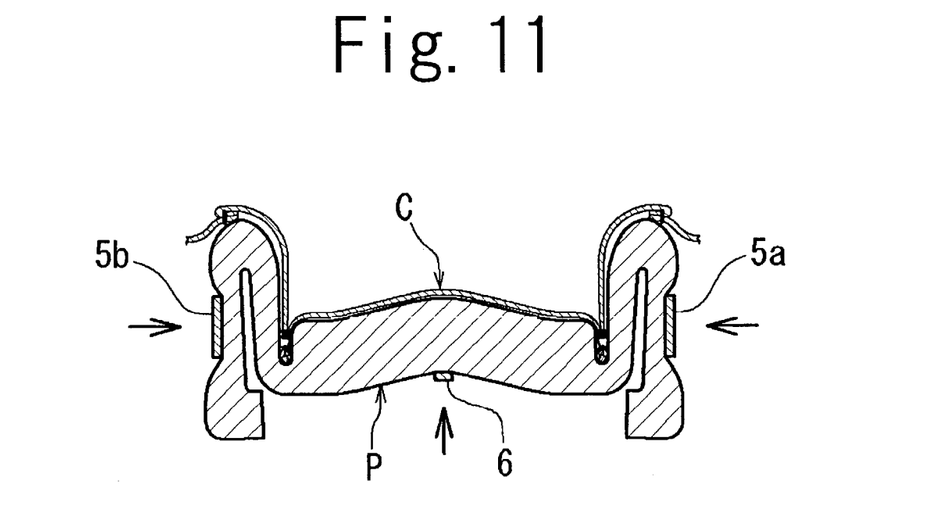
FIG. 11 is a schematic cross-sectional view of assistance in explaining a process of covering of the cushioned padding with the covering sheet which is carried out using the apparatus.
Figure 12:
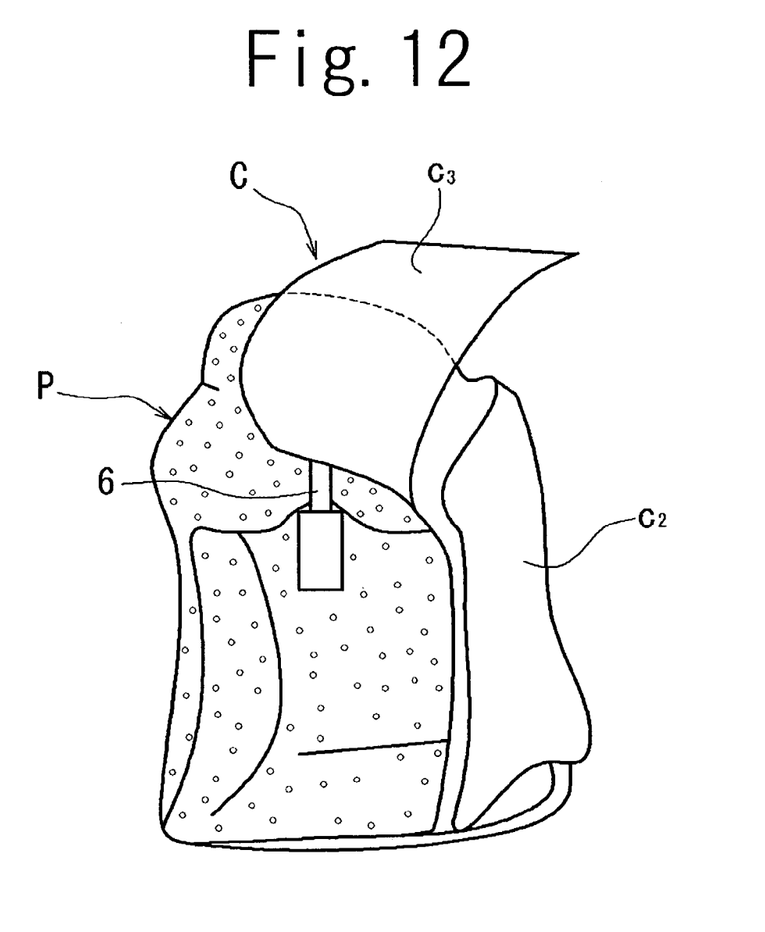
FIG. 12 is a schematic perspective view of assistance in explaining a state where the cushioned padding is pressed from a back side of the cushioned padding by a holding plate of the apparatus.

After the fastening of the covering sheet C to the cushioned padding P is completed as described above, covering of the cushioned padding P with the covering sheet C is carried out while causing the right side of the covering sheet C to be out. In the covering operation, the third drive cylinders 50 are actuated so as to be contracted, whereby the holding clamps 5a, 5b approach each other. As a result, the cushioned padding P is pressed from the both sides thereof by the holding clamps 5a, 5b and compressed and deformed by the holding clamps 5a, 5b. At this time, a width of the cushioned padding P is operatively narrowed by the holding clamps 5a, 5b as shown in FIG. 11. Therefore, the covering of the cushioned padding P with the covering sheet C can be easily performed without pulling the covering sheet C. Incidentally, in a state where the cushioned padding P is compressed and deformed by the holding clamps 5a, 5b, when the fourth drive cylinder 12 (see FIG. 7) is actuated so as to be extended, to thereby cause the holding plate 6 to be pressed against the back side of the cushioned padding P as shown in FIGS. 11 and 12, compression amount of the cushioned padding P can be further increased and the width of the cushioned padding P is further narrowed. Therefore, the covering operation of the cushioned padding P can be further easily carried out.

After the covering operation is finished, the third drive cylinders 50 are actuated so as to be extended, whereby the holding clamps 5a, 5b are moved away from the cushioned padding P. As a result, the cushioned padding is released from the condition where the cushioned padding is compressed and deformed by the holding clamps 5a, 5b. Also, the fourth drive cylinder 12 is actuated so as to be contracted, whereby the cushioned padding is released from the condition where the cushioned padding is pressed from the back side thereof by the holding plate 6. Thus, a combination of the cushioned padding P and covering sheet C can be removed from the apparatus.

As discussed above, the apparatus according to the present invention includes the hooking arms arranged at the both sides of the base table for causing the bulged portions of the cushioned padding on the supporting means to be pulled away from each other and causing the grooves of the cushioned padding to be widened when the fastening of the covering sheet to the cushioned padding is carried out, so that the apparatus facilitates the fastening of the covering sheet to the cushioned padding through the tensioning cords of the covering sheet.

Also, the apparatus according to the present invention includes the bracket plates arranged at the both sides of the base table for supporting the both sides of the cushioned padding on the supporting means, against which the bulged portions of the cushioned padding are pressed when the bulged portions of the cushioned padding are pulled away from each other by the hooking arms, so that the apparatus facilitates the fastening of the covering sheet to the cushioned padding even if the grooves of the cushioned padding are formed deeply in the cushioned padding, because the pulling of the bulged portions of the cushioned padding by the hooking arms can be effectively exerted on the grooves of the cushioned padding.

Also, the base table of the apparatus of the present invention is supported in the inclined posture to the stand post, so that the worker can efficiently carry out the assembling of the covering sheet onto the cushioned padding.

Also, the apparatus according to the present invention includes the holding clamps for pressing the cushioned padding on the supporting means from the both sides of the cushioned padding, causing the cushioned padding to be compressed and deformed, and causing the width of the cushioned padding to be narrowed when the covering of the cushioned padding with the covering sheet is performed, so that the apparatus facilitates performing of the covering of the cushioned padding with the covering sheet without pulling the covering sheet.

Also, the apparatus according to the present invention includes the holding plate for pressing the cushioned padding on the supporting means from the back side of the cushioned padding when the covering of the cushioned padding with the covering sheet is carried out, so that the apparatus facilitates performing of the covering of the cushioned padding with the covering sheet while causing the compression amount of the cushioned padding to be increased and causing the width of the cushioned padding to be further narrowed.

While the above description is made of the apparatus which facilitates successive performing of the fastening operation and the covering operation, the application of the present invention is not limited to such apparatus and the present invention may be applied to an apparatus which facilitates performing of the fastening operation and the covering operation separately.

Further, while the above description is made of the apparatus which facilitates assembling of the covering sheet onto the cushioned padding for the seat back, the application of the present invention is not limited to such apparatus and the present invention may be applied to an apparatus which facilitates assembling of the covering sheet onto a cushioned padding for a seat cushion.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An apparatus for facilitating assembling of a covering sheet onto a cushioned padding for a seat;
   said covering sheet being formed into a three-dimensional shape and having tensioning cords provided therein;
   said cushioned padding having a central portion, bulged portions formed at both sides of said central portion, and grooves formed in a surface of said central portion;
   said tensioning cords being to be received in said grooves of said cushioned padding and being to be fastened to said cushioned padding by C-rings which are to be shot into said grooves, at the time of fastening of said covering sheet to said cushioned padding;

said apparatus comprising:

a base table;

supporting means mounted on a front surface of said base table for receiving and supporting said cushioned padding thereon at the time of the assembling of said covering sheet onto said cushioned padding;

hooking arms arranged at both sides of said base table for causing said bulged portions of said cushioned padding on said supporting means to be pulled away from each other, to thereby cause said grooves of said cushioned padding to be widened, so that said apparatus facilitates the fastening of said covering sheet to said cushioned padding by said C-rings.

2. An apparatus as defined in claim 1, wherein said covering sheet comprises a first piece of covering material for covering said central portion of said cushioned padding, second pieces of covering material for covering said bulged portions of said cushioned padding, and third pieces of covering material for covering a back side of said cushioned padding, said first, second and third pieces of covering material being sewed together, whereby said covering sheet is formed into a three-dimensional shape, and wherein said cushioned padding has a cavity formed in said back side thereof, in which a seat frame is to be assembled, said cushioned padding being to be supported on said supporting means with said cavity receiving said supporting means.

3. An apparatus as defined in claim 2, further including supporting brackets arranged at the both sides of said base table for supporting said cushioned padding on said supporting means from both sides of said cushioned padding.

4. An apparatus as defined in claim 3, further including a stand post, said base table being supported in an inclined state to said stand post.

5. An apparatus as defined in claim 4, further including first drive means attached to said base table for causing said hooking arms to be moved forwardly from said base table and to be pivotally moved.

6. An apparatus as defined in claim 3, further including first drive means attached to said base table for causing said hooking arms to be moved forwardly from said base table and to be pivotally moved.

7. An apparatus as defined in claim 1, further including supporting brackets arranged at the both sides of said base table for supporting said cushioned padding on said supporting means from both sides of said cushioned padding.

8. An apparatus as defined in claim 7, further including a stand post, said base table being supported in an inclined state to said stand post.

9. An apparatus as defined in claim 8, further including first drive means attached to said base table for causing said hooking arms to be moved forwardly from said base table and to be pivotally moved.

10. An apparatus as defined in claim 7, further including first drive means attached to said base table for causing said hooking arms to be moved forwardly from said base table and to be pivotally moved.

11. An apparatus as defined in claim 1, further including a stand post, said base table being supported in an inclined state to said stand post.

12. An apparatus as defined in claim 11, further including first drive means attached to said base table for causing said hooking arms to be moved forwardly from said base table and to be pivotally moved.

13. An apparatus as defined in claim 2, further including a stand post, said base table being supported in an inclined state to said stand post.

14. An apparatus as defined in claim 13, further including first drive means attached to said base table for causing said hooking arms to be moved forwardly from said base table and to be pivotally moved.

15. An apparatus as defined in claim 1, further including first drive means attached to said base table for causing said hooking arms to be moved forwardly from said base table and to be pivotally moved.

16. An apparatus as defined in claim 2, further including first drive means attached to said base table for causing said hooking arms to be moved forwardly from said base table and to be pivotally moved.

17. An apparatus as defined in claim 1 wherein the hooking arms are adapted to engage with the bulged portions of said cushioned padding.

18. An apparatus as defined in claim 17 wherein each of the hooking arms comprises an arcuate portion for engaging directly with a respective bulged portion of said cushioned padding.

19. An apparatus for facilitating assembling of a covering sheet onto a cushioned padding for a seat;

said covering sheet being formed into a three-dimensional shape and having tensioning cords provided therein;

said cushioned padding having a central portion, bulged portions formed at both sides of said central portion, and grooves formed in a surface of said central portion;

said tensioning cords being to be received in said grooves of said cushioned padding and being to be fastened to said cushioned padding by C-rings which are to be shot into said grooves, at the time of fastening of said covering sheet to said cushioned padding;

said apparatus comprising:

a base table;

supporting means mounted on a front surface of said base table for receiving and supporting said cushioned padding thereon at the time of the assembling of said covering sheet onto said cushioned padding; and hooking arms arranged at both sides of said base table for causing said bulged portions of said cushioned padding on said supporting means to be pulled away from each other, to thereby cause said grooves of said cushioned padding to be widened;

supporting brackets arranged at the both sides of said base table for supporting said cushioned padding on said supporting means from both sides of said cushioned padding;

spaced apart holding clamps arranged on said front surface of said base table for pressing said cushioned padding on said supporting means from the both sides of said cushioned padding to be deformed and compressed in such a manner that a width of said cushioned padding is narrowed at the time of covering of said cushioned padding with said covering sheet;

a holding plate arranged at an upper portion of said base table for pressing said cushioned padding on said supporting means from a back side of said cushioned padding at the time of the covering of said cushioned padding with said covering sheet;

first drive means attached to said base table for causing said hooking arms to be moved forwardly from said base table and to be pivotally moved;

second drive means mounted on said surface of said base table for causing said holding clamps to be moved toward the both sides of said cushioned padding on said supporting means; and third drive means mounted to said base table for causing said holding plate to be moved toward the back side of said cushioned padding.

20. An apparatus as defined in claim 19, wherein said covering sheet comprises a first piece of covering material for covering said central portion of said cushioned padding, second pieces of covering material for covering said bulged portions of said cushioned padding, and third pieces of covering material for covering a back side of said cushioned padding, said first, second and third pieces of covering material being sewed together, whereby said covering sheet is formed into a three-dimensional shape, and wherein said cushioned padding has a cavity formed in said back side thereof, in which a seat frame is to be assembled, said cushioned padding being to be supported on said supporting means with said cavity receiving said supporting means.

21. An apparatus as defined in claim 20, further including a stand post, said base table being supported in an inclined state to said stand post.

22. An apparatus as defined in claim 19, further including a stand post, said base table being supported in an inclined state to said stand post.

23. An apparatus as defined in claim 19 wherein the hooking arms are adapted to engage with the bulged portions of said cushioned padding.

24. An apparatus as defined in claim 23 wherein each of the hooking arms comprises an arcuate portion for engaging directly with a respective bulged portion of said cushioned padding.

* * * * *